United States Patent

Ramanathan et al.

[11] Patent Number: 5,196,521
[45] Date of Patent: Mar. 23, 1993

[54] AZO DYES PREPARED USING 2-ALKYLAMINO-3-CYANO-4,6-DIAMINOPYRIDINES AS COUPLING COMPONENTS

[75] Inventors: Visvanathan Ramanathan, Basle; Angelo D. Casa, Riehen, both of Switzerland

[73] Assignee: Ciba-Geigy Corporation, Ardsley, N.Y.

[21] Appl. No.: 719,868

[22] Filed: Jun. 24, 1991

[30] Foreign Application Priority Data

Jun. 27, 1990 [CH] Switzerland .......................... 2134/90

[51] Int. Cl.$^5$ .......................... C09B 29/42; D06P 1/18
[52] U.S. Cl. .......................... 534/773; 534/770; 546/289
[58] Field of Search .......................... 534/773

[56] References Cited

U.S. PATENT DOCUMENTS

| | | | |
|---|---|---|---|
| 4,066,637 | 1/1978 | Ramanathan | 534/773 X |
| 4,208,324 | 6/1980 | Ramanathan | 534/773 X |
| 4,243,583 | 1/1981 | Portmann | 534/735 X |
| 4,401,600 | 8/1983 | Portmann | 534/735 X |

FOREIGN PATENT DOCUMENTS 606297 10/1978 Switzerland .

*Primary Examiner*—Mary C. Lee
*Assistant Examiner*—Fiona T. Powers
*Attorney, Agent, or Firm*—Marla J. Mathias; Edward McC.Roberts

[57] ABSTRACT

The dyes of the formula

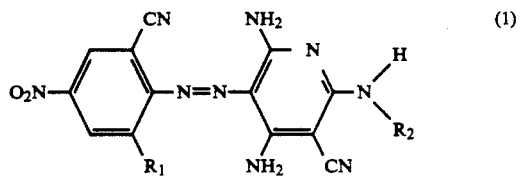

in which $R_1$ is hydrogen, halogen or $CF_3$ and $R_2$ is substituted or unsubstituted alkyl, where $R_2$ must not be ethoxycarbonylethyl if $R_1$ is hydrogen are suitable for the dyeing of polyester material in red hues having very good lightfastness.

5 Claims, No Drawings

AZO DYES PREPARED USING 2-ALKYLAMINO-3-CYANO-4,6-DIAMINOPYRIDINES AS COUPLING COMPONENTS

The present invention relates to disperse dyes, processes for their preparation and their use for the dyeing of textile materials.

The dyes according to the invention have the formula

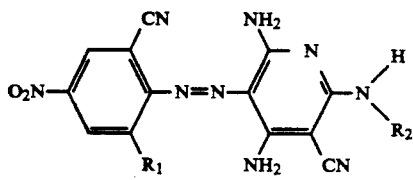

(1)

in which $R_1$ is hydrogen, halogen or $CF_3$ and $R_2$ is substituted or unsubstituted alkyl, where $R_2$ must not be ethoxycarbonylethyl if $R_1$ is hydrogen.

Halogen is generally understood to mean fluorine, bromine or iodine or in particular chlorine.

According to the invention, alkyl radicals are generally understood to mean straight-chain, branched or cyclic alkyl groups. Examples are methyl, ethyl, propyl, i-propyl, butyl, i-butyl, tert-butyl, amyl, tert-amyl (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, decyl, dodecyl, cyclopentyl, cyclohexyl, methylcyclohexyl and their corresponding isomers. The alkyl radicals preferably contain 1 to 8 C atoms, in particular 3 to 8 C atoms.

These alkyl radicals can be substituted, for example, by hydroxyl, alkoxy, phenoxy, halogen, cyano or phenyl, it being possible for the alkyl and phenyl groups in these substituents to be also substituted, for example by hydroxyl, alkoxy or phenoxy. Examples of substituted alkyl groups are methoxyethyl, ethoxyethyl, methoxypropyl, ethoxypropyl, butoxypropyl, 2-ethylhexoxypropyl, hydroxyethoxyethyl, hydroxyethoxypropyl, methoxyethoxyethyl, methoxyethoxypropyl, butoxyethoxyethyl, butoxyethoxypropyl, phenoxyethoxyethyl, phenoxyethoxypropyl, chloroethoxyethyl, cyanoethoxypropyl, benzyl or phenethyl.

$R_2$ is preferably unsubstituted $C_1$–$C_8$alkyl or a radical of the formula

(2)

in which $R_3$ is $C_2$–$C_4$alkylene, $R_4$ is $C_2$–$C_8$alkylene and X is H, —OH, —O-phenyl or —O—$C_1$–$C_8$alkyl.

$R_1$ is preferably halogen, in particular chlorine or $CF_3$.

In particularly preferred dyes of the formula (1) according to the invention, $R_1$ is chlorine or $CF_3$ and $R_2$ is unsubstituted $C_1$–$C_8$alkyl or a radical of the formula (2) in which $R_3$, $R_4$ and X are as defined in formula (2).

Of these, those in which $R_1$ is chlorine and $R_2$ is a radical of the formula

(2)

in which $R_3$ and $R_4$, independently of one another, are each ethylene or 1,3-propylene and X is methoxy, ethoxy or phenoxy are particularly preferred.

The dyes according to the invention are prepared in a manner known per se, for example, by diazotizing an amine of the formula

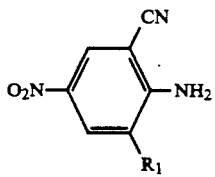

(3)

and coupling the product with a coupling component of the formula

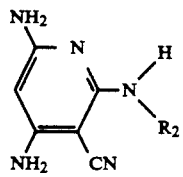

(4)

in which $R_1$ and $R_2$ are as defined in formula (1).

The compounds of the formula (3) and (4) are known or can be prepared in a manner known per se and diazotization and coupling are carried out in the usual manner.

It is also possible to diazotize a compound of the formula (3) which contains halogen instead of cyano (-CN) and coupling the product with a coupling component of the formula (4) and then exchanging halogen for cyano in the usual manner.

The compounds of the formula (1) according to the invention can be used as dyes for the dyeing and printing of semisynthetic and in particular synthetic hydrophobic fibre materials, in particular textile materials. Textile materials made of blended fabrics containing semisynthetic or synthetic hydrophobic textile materials of this type can also be dyed or printed by means of the compounds according to the invention.

Suitable semisynthetic textile materials are in particular cellulose 2½-acetate and cellulose triacetate.

Synthetic hydrophobic textile materials comprise in particular linear, aromatic polyesters, for example those made from terephthalic acid and glycols, in particular ethylene glycol or condensation products of terephthalic acid with 1,4-bis(hydroxymethyl)cyclohexane; of polycarbonates, for example those of α,α-dimethyl-4,4'-dihydroxydiphenylmethane with phosgene, and fibres based on polyvinyl chloride and polyamide.

The compounds according to the invention are applied to the textile materials by known dyeing methods. For example, polyester fibre materials are dyed by the exhaust method from aqueous dispersion in the presence of conventional anionic or nonionic dispersants and, if desired, conventional swelling agents (carriers) at temperatures between 80° and 140° C. Secondary cellulose acetate is preferably dyed between about 65° and 85° C. and cellulose triacetate at temperatures of up to 115° C.

The novel dyes do not or only slightly stain any wool and cotton also present in the dyebath (very good reserve), so that they can also be readily used for the dyeing of polyester/wool and polyester/cellulose fibre blended fabrics.

The dyes according to the invention are suitable for the dyeing by the thermosol process, by the exhaust method and for printing processes.

The textile material mentioned can be present in a wide range of processing forms, for example as fibre, filament or nonwoven, as woven or knitted fabric.

It is advantageous to convert the dyes according to the invention before their use into a dye preparation. To this end, the dye is ground such that its particle size is on average between 0.1 and 10 microns. The grinding can take place in the presence of dispersants. For example, the dried dye is ground together with a dispersant or kneaded in the form of a paste together with a dispersant and then dried in vacuo or by spraying. The preparations thus obtained can be used for preparing printing pastes and dyebaths after addition of water.

When printing, the conventional thickeners will be used, for example modified or unmodified natural products, for example alginates, British gum, gum arabic, crystalline gum, carob seed flour, tragacanth, carboxymethylcellulose, hydroxyethylcellulose, starch or synthetic products, for example polyacrylamides, polyacrylic acid or copolymers thereof or polyvinyl alcohols.

The dyes according to the invention produce on the materials mentioned, in particular the polyester material, level red-orange or red hues having very good wearfastness properties, such as in particular good lightfastness, fastness to dry heat setting, pleating, chlorine and wet fastness, such as water, perspiration and wash fastness; furthermore, the dyes are distinguished by very good rub fastness. The very good lightfastness of the dyeings obtained in combination with high brilliance may be mentioned in particular.

The dyes according to the invention can also be readily used for the production of mixed shades together with other dyes or together with a suitable yellow and blue dye for the trichromatic dyeing. It is of course also possible to use mixtures of the dyes according to the invention with one another. Owing to the very good lightfastness even at elevated temperatures, the dyes according to the invention are highly suitable for the dyeing of polyester textile material for automobile seat covers.

The abovementioned uses of the azo compounds of the formula (1) according to the invention are also provided by the present invention as is a process for the dyeing or printing of semisynthetic or synthetic hydrophobic fibre material, in particular textile material, which consists in applying one or more compounds of the formula (1) to the material mentioned or incorporating it therein. The hydrophobic fibre material mentioned is preferably textile polyester material. Further substrates which can be treated by the process according to the invention and preferred process conditions can be found above under the detailed description of the use of the compounds according to the invention.

The invention also relates to the hydrophobic fibre material, preferably polyester textile material, dyed or printed by the process mentioned.

The examples which follow illustrate the invention in more detail without limiting it thereto. Parts and percentages are by weight, unless stated otherwise.

EXAMPLE 1

A) 10.65 parts of 2-bromo-3-cyano-4,6-diaminopyridine, 28 parts of ethanol and 20 parts of 3-(2-methoxyethoxy)propylamine are heated in an autoclave at 110° C. for 24 hours. The reaction solution, which contains the compound of the formula

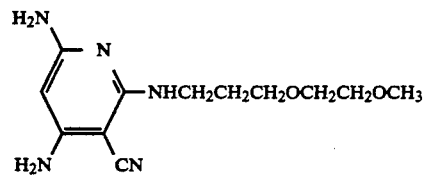

is used for the coupling.

B) 7.5 parts of sodium nitrite are dissolved in 140 parts of sulfuric acid at 5°–10° C. 19.7 parts of 2-chloro-6-cyano-4-nitroaniline are then stirred in and the mixture is stirred at 10°–15° C. for 2 hours. The solution is poured into 600 parts of ice water. Excess nitrous acid is removed using sulfamic acid. The diazo solution thus obtained is added to a solution of 26.5 parts of 2-methoxyethoxypropylamino-3-cyano-4,6-diaminopyridine in 158 parts of ethanol. After coupling is complete, the dye of the formula

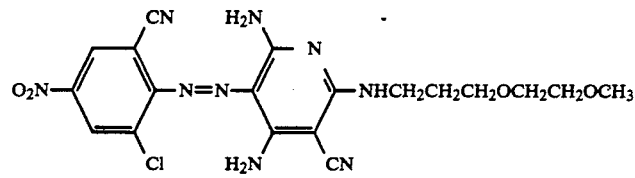

is filtered off, washed with water and dried. It dyes polyester fibres in brilliant red shades having excellent fastness properties, in particular very good lightfastness.

EXAMPLE 2

7.5 parts of sodium nitrite are dissolved in 140 parts of sulfuric acid at 5°–10° C. 28.5 parts of 2-bromo-4-nitro-6-trifluoromethylaniline are stirred into the solution obtained, and the mixture is stirred at 10°–15° C. for 2 hours. The solution is poured into 600 parts of ice water, and excess nitrous acid is removed using sulfamic acid. The diazo solution thus obtained is added to a solution of 32.7 parts of 2-phenoxyethoxypropylamino-3-cyano-4,6-diaminopyridine in 240 parts of ethanol. After coupling is complete, the dye is filtered off, washed with water and dried.

5.8 parts of copper(I) cyanide are added to 31.5 parts of the bromo dye obtained in 100 parts of pyridine, and the mixture is stirred at 100° C. for 5 hours. After cooling, the dye is precipitated with water, filtered off with suction and washed with dilute hydrochloric acid and water, to give the dye of the formula

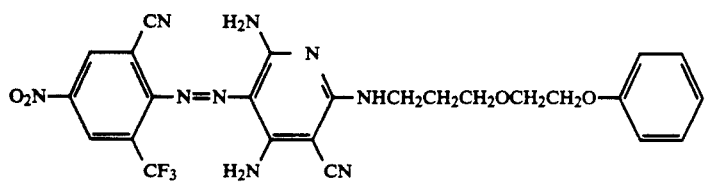

It dyes polyester fibres in brilliant red shades of excellent fastness properties.

EXAMPLES 3–32

Analogously as described in Examples 1 and 2, the dyes listed in the table below are obtained. They dye polyester fibres in the hues listed in the last column.

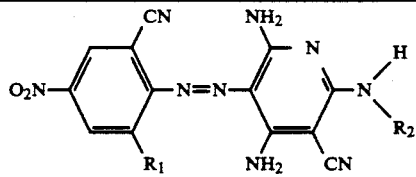

| Example | $R_1$ | $R_2$ | Hue on polyester |
|---|---|---|---|
| 3 | H | —(CH$_2$)$_5$CH$_3$ | red-orange |
| 4 | H | —(CH$_2$)$_3$O(CH$_2$)$_2$O—⟨phenyl⟩ | red-orange |
| 5 | H | —(CH$_2$)$_3$O(CH$_2$)$_2$OCH$_3$ | red-orange |
| 6 | H | —(CH$_2$)$_3$O(CH$_2$)$_2$OC$_4$H$_9$ | red-orange |
| 7 | H | —(CH$_2$)$_3$OCH$_2$CHC$_4$H$_9$ \| C$_2$H$_5$ | red-orange |
| 8 | Cl | —(CH$_2$)$_3$OCH$_2$CHC$_4$H$_9$ \| C$_2$H$_5$ | red |
| 9 | Cl | —(CH$_2$)$_3$OCH$_3$ | red |
| 10 | Cl | —(CH$_2$)$_3$OCH(CH$_3$)$_2$ | red |
| 11 | Cl | —(CH$_2$)$_3$O(CH$_2$)$_2$OC$_2$H$_5$ | red |
| 12 | Cl | —(CH$_2$)$_3$O(CH$_2$)$_2$OC$_4$H$_9$ | red |
| 13 | Cl | —(CH$_2$)$_3$O(CH$_2$)$_2$O—⟨phenyl⟩ | red |
| 14 | Cl | (CH$_2$)$_5$CH$_3$ | red |
| 15 | Cl | —CH$_2$CHC$_4$H$_9$ \| C$_2$H$_5$ | red |
| 16 | Cl | —(CH$_2$)$_3$O(CH$_2$)$_3$CH$_3$ | red |
| 17 | Cl | —C$_2$H$_4$OC$_2$H$_5$ | red |
| 18 | Cl | —C$_2$H$_4$OCH$_3$ | red |
| 19 | Cl | —C$_2$H$_4$OC$_2$H$_4$OH | red |
| 20 | Br | —(CH$_2$)$_3$O(CH$_2$)$_2$OCH$_3$ | red |
| 21 | Br | —(CH$_2$)$_3$O(CH$_2$)$_2$O—⟨phenyl⟩ | red |
| 22 | Br | —(CH$_2$)$_3$OCH$_3$ | red |
| 23 | CF$_3$ | —(CH$_2$)$_2$CH$_3$ | red |
| 24 | CF$_3$ | —(CH$_2$)$_3$CH$_3$ | red |
| 25 | CF$_3$ | —(CH$_2$)$_5$CH$_3$ | red |
| 26 | CF$_3$ | —(CH$_2$)$_3$O(CH$_2$)$_2$OCH$_3$ | red |
| 27 | CF$_3$ | —(CH$_2$)$_3$O(CH$_2$)$_2$OC$_2$H$_5$ | red |
| 28 | CF$_3$ | —(CH$_2$)$_3$OCH$_3$ | red |
| 29 | CF$_3$ | —(CH$_2$)$_3$OCH$_2$CHC$_4$H$_9$ \| C$_2$H$_5$ | red |
| 30 | CF$_3$ | —(CH$_2$)$_3$OCH(CH$_3$)$_2$ | red |
| 31 | CF$_3$ | —C$_2$H$_4$OC$_2$H$_4$OH | red |
| 32 | CF$_3$ | —CH$_2$CHC$_4$H$_9$ \| C$_2$H$_5$ | red |

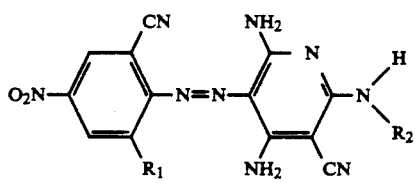

EXAMPLE 33

1 g of the dye described in Example 1 is ground together with 17 g of water and 2 g of a conventional dispersant of the dinaphthylmethanedisulfonate type in a sandmill and converted into a 5% aqueous dispersion.

This formulation is used to produce a 1% dyeing (relative to pigment and substrate) on polyester fabric by the HT exhaust method at 130° C., and the dyed fabric is reduction-cleaved. The red dyeing thus obtained has very good wear fastness properties and in particular excellent lightfastness.

What is claimed is:

1. A dye of the formula (1)

in which $R^1$ is halogen and $R_2$ is unsubstituted open-chain alkyl or open-chain alkyl which is substituted by hydroxyl, alkoxy, phenoxy, halogen, cyano or phenyl, in which the alkyl and phenyl groups in these substituents are unsubstituted or substituted by hydroxyl, alkoxy or phenoxy.

2. A dye according to claim 1, in which $R_1$ is chlorine.

3. A dye according to claim 1, in which $R_2$ is unsubstituted $C_1$–$C_8$alkyl or a radical of the formula $$-R_3-O-R_4-X \quad (2)$$

in which $R_3$ is $C_2$-$C_4$alkylene, $R_4$ is $C_2$-$C_8$alkylene and X is H, —OH, —O—phenyl or —O—$C_1$-$C_8$alkyl.

4. A dye according to claim 1, in which $R_1$ is chlorine and $R_2$ is unsubstituted $C_1$-$C_8$alkyl or a radical of the formula $$-R_3-O-R_4-X \quad (2)$$

in which $R_3$ is $C_2$-$C_4$alkylene, $R_4$ is $C_2$-$C_8$alkylene and X is H, —OH, —O—phenyl or —O—$C_1$-$C_8$alkyl.

5. A dye according to claim 4, in which $R_1$ is chlorine and $R_2$ is a radical of the formula $$-R_3-O-R_4-X \quad (2)$$

in which $R_3$ and $R_4$, independently of one another, are each ethylene or 1,3-propylene and X is methoxy, ethoxy or phenoxy.

* * * * *